US009665802B2

United States Patent
Wang et al.

(10) Patent No.: US 9,665,802 B2
(45) Date of Patent: May 30, 2017

(54) OBJECT-CENTRIC FINE-GRAINED IMAGE CLASSIFICATION

(71) Applicant: NEC Laboratories America, Inc., Princeton, NJ (US)

(72) Inventors: Xiaoyu Wang, Sunnyvale, CA (US); Tianbao Yang, San Jose, CA (US); Yuanqing Lin, Sunnyvale, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/884,963

(22) Filed: Oct. 16, 2015

(65) Prior Publication Data

US 2016/0140424 A1    May 19, 2016

Related U.S. Application Data

(60) Provisional application No. 62/079,303, filed on Nov. 13, 2014.

(51) Int. Cl.
| | |
|---|---|
| *G06K 9/66* | (2006.01) |
| *G06K 9/62* | (2006.01) |
| *G06K 9/52* | (2006.01) |
| *G06K 9/46* | (2006.01) |
| *G06N 3/04* | (2006.01) |

(52) U.S. Cl.
CPC ............ *G06K 9/66* (2013.01); *G06K 9/4671* (2013.01); *G06K 9/52* (2013.01); *G06K 9/6256* (2013.01); *G06K 9/6267* (2013.01); *G06N 3/0454* (2013.01); *G06K 2009/4666* (2013.01)

(58) Field of Classification Search
CPC ...... G06K 9/66; G06K 9/6267; G06K 9/6256; G06K 9/4671; G06K 9/52; G06K 2009/4666; G06N 3/0454
See application file for complete search history.

(56) References Cited

U.S. PATENT DOCUMENTS

| | | | |
|---|---|---|---|
| 4,637,055 A * | 1/1987 | Taylor ...................... | G06K 9/82 382/133 |
| 5,546,188 A * | 8/1996 | Wangler .............. | A01M 7/0089 356/398 |
| 8,880,273 B1 | 11/2014 | Chatham | |
| 9,081,650 B1 * | 7/2015 | Brinkmann .......... | G07C 5/0808 |
| 9,400,925 B2 * | 7/2016 | Bourdev ............. | G06K 9/00362 |
| 2003/0179228 A1 * | 9/2003 | Schreiber .......... | G06F 17/30557 715/738 |
| 2004/0153671 A1 * | 8/2004 | Schuyler ............. | G07C 9/00111 726/9 |

(Continued)

OTHER PUBLICATIONS

Collet, Alvaro, "Structure Discovery in Multi-modal Data: a Region-based Approach", 2011 IEEE Internation Conference on Robotics and Automation, Shanghai International Conference Center.*

(Continued)

*Primary Examiner* — Chan Park
*Assistant Examiner* — Elisa Rice
(74) *Attorney, Agent, or Firm* — Joseph Kolodka

(57) ABSTRACT

Systems and methods are disclosed for classifying vehicles by performing scale aware detection; performing detection assisted sampling for convolutional neural network (CNN) training, and performing deep CNN fine-grained image classification to classify the vehicle type.

18 Claims, 5 Drawing Sheets

(56) References Cited

U.S. PATENT DOCUMENTS

| | | | | |
|---|---|---|---|---|
| 2004/0208375 A1* | 10/2004 | Gupta | ................ | G06K 9/00362 |
| | | | | 382/217 |
| 2004/0234136 A1* | 11/2004 | Zhu | ..................... | G06K 9/3241 |
| | | | | 382/224 |
| 2005/0008193 A1* | 1/2005 | Toyama | ................... | G06T 7/20 |
| | | | | 382/103 |
| 2008/0025568 A1* | 1/2008 | Han | ..................... | G06K 9/4642 |
| | | | | 382/103 |
| 2010/0103170 A1* | 4/2010 | Baloch | .............. | G06K 9/00201 |
| | | | | 345/420 |
| 2011/0119017 A1* | 5/2011 | Kamp | ................... | G08B 13/06 |
| | | | | 702/127 |
| 2011/0229025 A1* | 9/2011 | Zhao | ................... | G06K 9/4671 |
| | | | | 382/165 |
| 2012/0156653 A1* | 6/2012 | Wokurka | ................ | G09B 9/16 |
| | | | | 434/30 |
| 2014/0139633 A1* | 5/2014 | Wang | ................ | G06K 9/00201 |
| | | | | 348/46 |
| 2016/0034788 A1* | 2/2016 | Lin | ........................ | G06K 9/627 |
| | | | | 382/157 |

OTHER PUBLICATIONS

Alex Krizhevsky et al., "ImageNet Classification with Deep Convolutional Neural Networks" NIPS (, 2012).

* cited by examiner

OBJECT-CENTRIC FINE-GRAINED IMAGE CLASSIFICATION

This application claims priority to Provision Application 62/079,303 filed Nov. 13, 2014, the content of which is incorporated by reference.

BACKGROUND

The present system is related to Object-centric Fine-grained Image Classification.

Significant progress has been made in image classification using deep convolutional neural networks (CNN). However, progress on the use of deep CNN for fine-grained image classification has been hampered by the lack of large-scale training data to avoid over-fitting fine-grained image labels. In fact, most existing fine-grained image classification benchmark dataset often consist of only a few tens of thousands of images. For example, while DCNN suffers from over-fitting on small datasets, most existing fine-grained classification benchmark datasets are fairly small because fine-grained class labels are hard to obtain, e.g., it is difficult to use Mechanical Turk for the labeling task due to lack of deep domain knowledge.

SUMMARY

Systems and methods are disclosed for classifying physical objects such as vehicles by performing scale aware detection; performing detection assisted sampling for convolutional neural network (CNN) training, and performing deep CNN fine-grained image classification to classify the vehicle type.

Advantages of the system may include one or more of the following. Our system leverages unique properties of fine-grained image classification through an effective pipeline with two processes: saliency-aware object detection and multinomial object-centric sampling for deep CNN training. The first component is achieved by constructing saliency-aware training data construction and training an adapted Regionlet detector. Compared to traditional detection approaches, our detector yields higher response on salient objects. The system can apply location information with a powerful object detector that can handle the imperfectness of detection results. The saliency-aware object detection approach is ideal for the setting of fine-grained image classification, and the uncertainty of detection results are naturally handled in our scheme. The framework is demonstrated to be very effective, improving top-1 accuracy to 89.3% (from 81.6%) on one exemplary large-scale fine-grained car classification dataset.

DESCRIPTION

Figure 1:
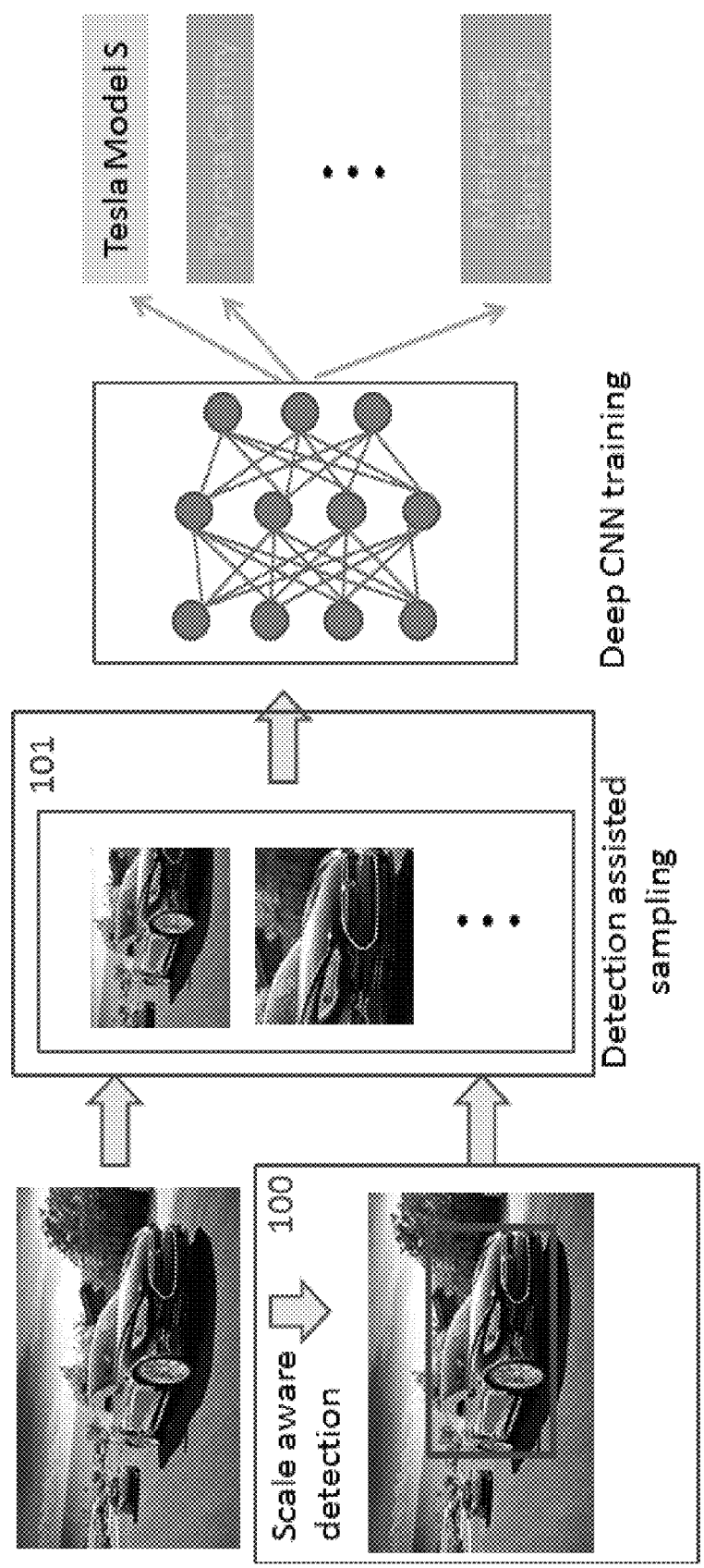
FIG. 1 shows an exemplary detection assisted fine-grained image classification framework.

FIG. 1 shows an exemplary detection assisted fine-grained image classification framework. The system includes a scale aware detection unit 102 that determines a target and provides information to a detection assisted sampling unit 104. The output of unit 104 is provided to a deep CNN training unit 106, which in turn classifies an object 108. In one embodiment, the system classifies different cars.

Our system uses a large-scale fine-grained car classification dataset. A specific object detection pipeline for fine-grained image classification includes dedicated detection dataset construction and saliency aware object detector learning. Object-centric convolution neural network replaces uniform sampling in conventional neural network training with multinomial sampling that gives more emphasis to potential object locations. The system of FIG. 1 recognizes a car image as "which brand, which model and which year blanket". Each year blanket means the year range that a car model does not change its outlook design (so that the cars in a year blanket are not visually distinguishable). This car dataset, in term of the number of total images, is more than one magnitude larger than the Stanford car dataset. The constructed large-scale car classification dataset enables us to study the deep CNN on a fine-grained image classification setting.

We observe that there are many classes that are very similar to each other but have large intra-class distance. One major factor to the phenomenon is due to the sampling strategy used in conventional neural network training, i.e. uniformly sampling training patches from the whole image. We address the fine-grained classification challenge in a different aspect with a unified framework composed of saliency aware object detection and object-centric convolutional neural networks (ocCNN). Our framework is effective on the car classification task—the process achieves 81.6% top one classification accuracy.

The target of object detection for fine-grained image classification is different to that of general object detection. In later case, we aimed at localizing all the objects of interest. In fine-grained image classification, one object typically represents the fine-grained label of the image. The most salient object generally corresponds to the fine-grained label if multiple objects exists. Thus small detections are less likely to be the required compared to bigger detections. If two detections have the same scale, completely visible objects are more likely to be of interest than significantly occluded objects. These differences put specific requirements on the object detector and the training strategy. The object detector should be aware of object scales and occlusions. Ideally, small detection responses should be linked to relatively small or occluded objects, or false alarms. We resolve the first challenge by constructing a saliency aware dataset and using a scale aware object detector. The occlusion awareness is implicitly achieved by training the detector with visible objects.

Figure 2:
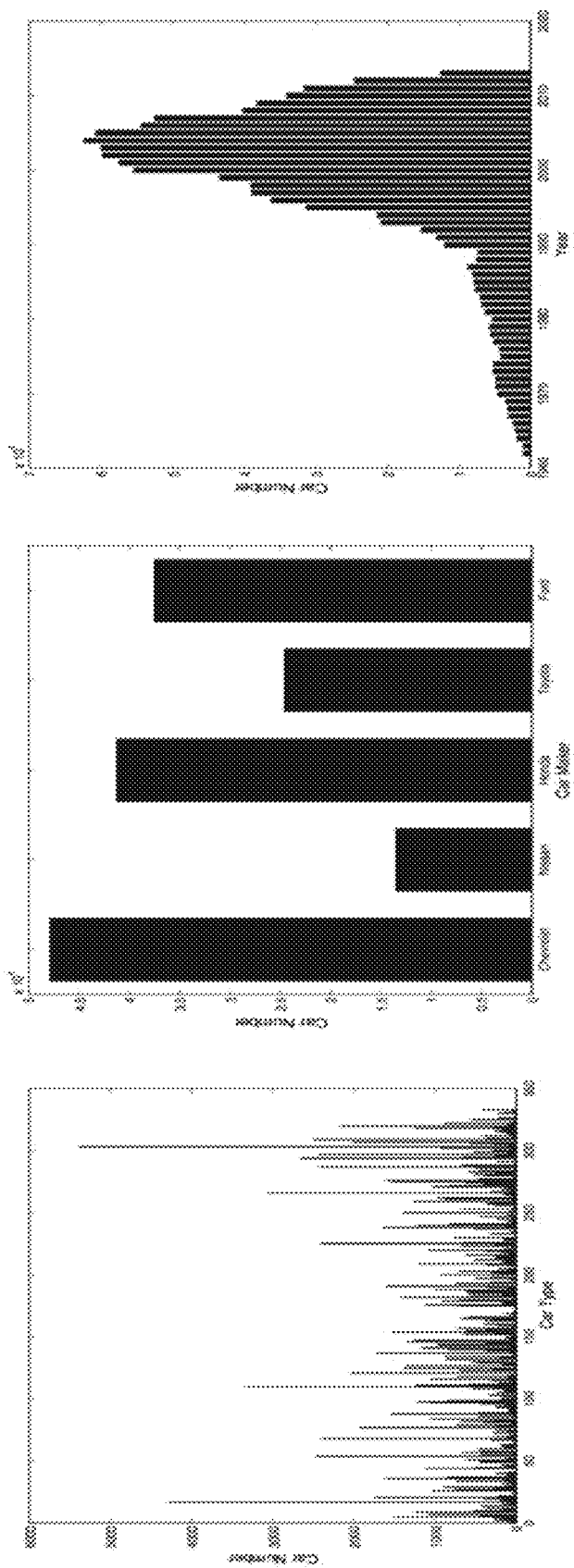
FIG. 2 shows an exemplary fine-grained car classification accuracy with different sampling strategies.

FIG. 2 shows an exemplary fine-grained car classification accuracy with different sampling strategies. As shown in FIG. 2, centered uniform is done with uniformly sampled training samples from the center of the image. Uniform sampling is done with uniformly sampled training images from the entire image. Multinomial sampling is done with uniformly sampled training images with a probability which is proportional to the normalized overlap between the sample and the detection.

Figure 3:
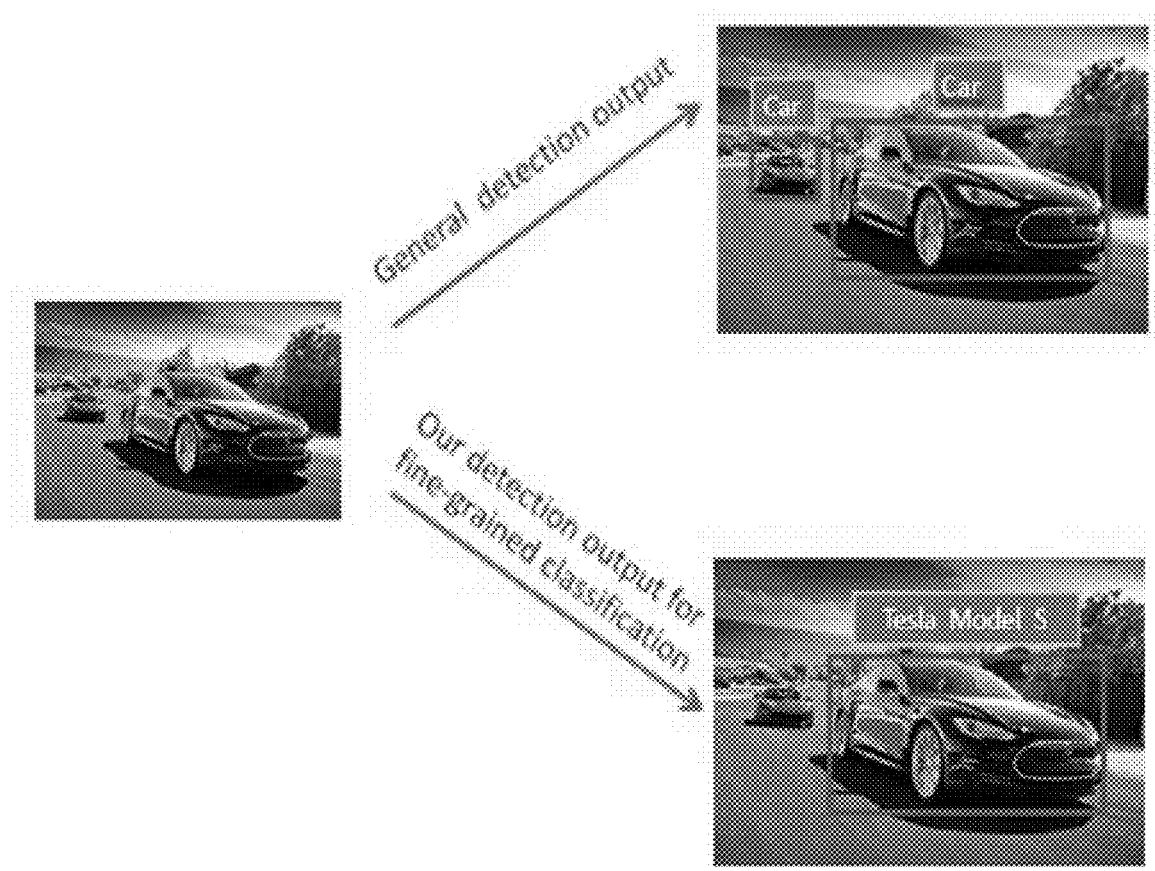
FIG. 3 shows an exemplary difference between object detection for fine-grained image classification and general object detection.

FIG. 3 shows an exemplary difference between object detection for fine-grained image classification and general object detection. Difference between object detection for fine-grained image classification and general object detection can be observed. Our detection problem is defined to find the most salient object target in the image, i.e. only the most salient detection is output if there are multiple detections.

Figure 4:
FIG. 4 shows exemplary detections on the large-scale car dataset.
Figure 5:
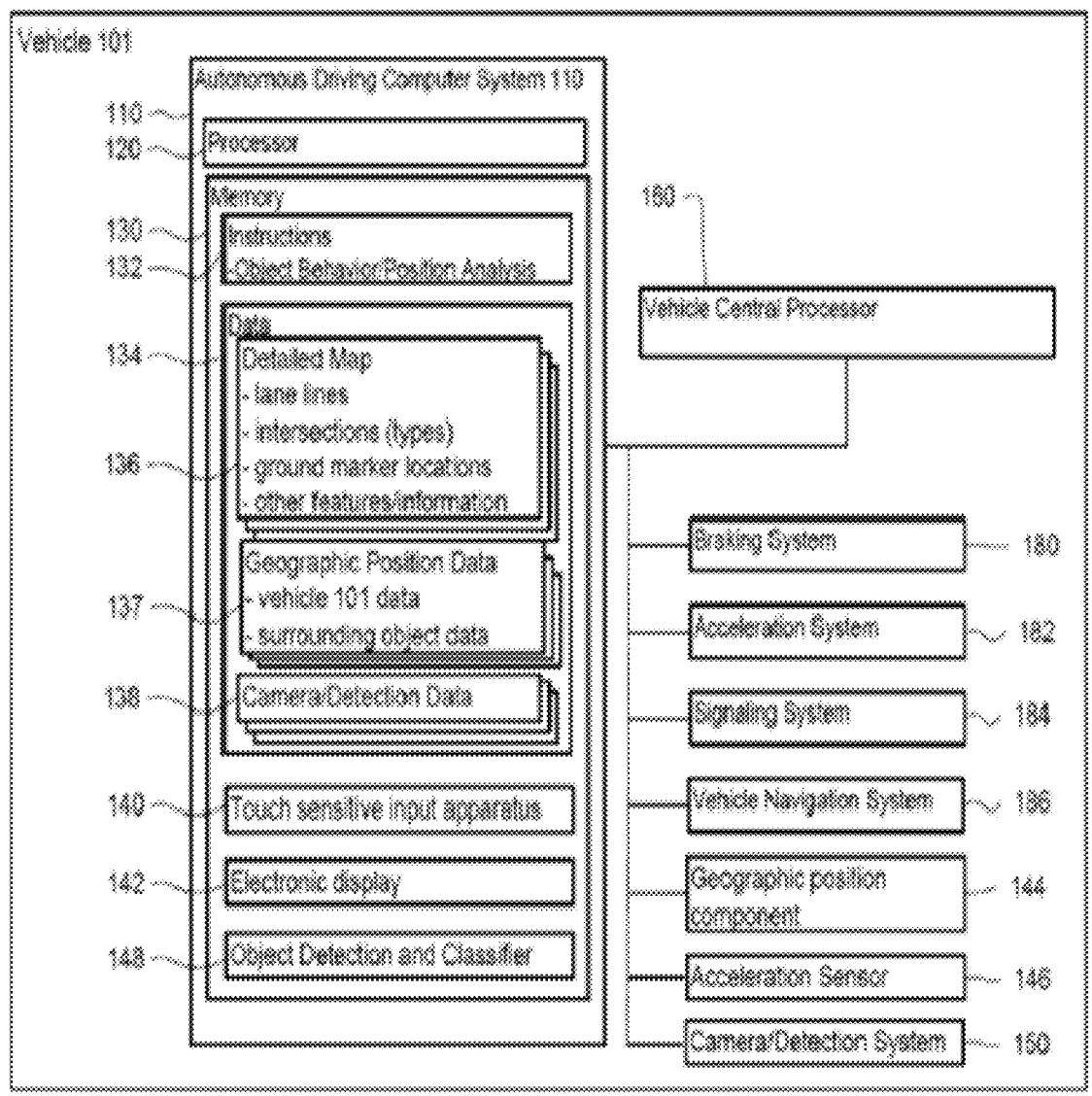
FIG. 5 shows an exemplary smart car with the image classification framework of FIG. 1.

FIG. 4 shows exemplary detections on the large-scale car dataset. The detector is quite robust to multiple viewpoints. It gives the highest score to the salient car if there are multiple cars in the images.

In one embodiment, we construct a training/testing set for detection. The embodiment generates a saliency aware training set for our object detector. To facilitate saliency aware detection, we only label the salient object in one image, and this is consistent with the fine-grained category label, i.e. the labeled object should belong to the fine-grained category. For each image, we label one and only one object as the detection ground truth. When multiple instances are available, the object selection is done based on mixed criteria of saliency:

- The bigger object is preferred over small objects.
- The visible object is preferred over occluded objects.
- An object in the center is preferred over objects in the corner.
- The object's fine-grained category label is consistent with the image label.

Typically only one object satisfies one or more of these criteria. In any case multiple instances equally meet these criteria, which is not likely to happen, a random object is selected for the ground truth labeling.

Labeling all the images in the large-scale dataset is expensive and unnecessary. In one embodiment, we labeled 13745 images, in which 11000 images are used for training, and 2745 images are used for testing, which corresponds to slightly more than 8% of the entire fine-grained car dataset.

As feature extraction regions are automatically adapted to accommodate the detection window size, a Regionlet detector is used for our fine-grained image classification. We use selective search to generate object proposals for detector training and testing. In the training, object proposals with more than 70% overlap with the ground truth are selected as positive samples. Object proposals with have less than 0.3% overlap with the ground truth are used as negative training samples. There might be small cars, occluded cars, cars off the center in the negative training samples. We apply this training protocol to enhance the saliency aware training. Smaller or occluded cars are likely to have relatively smaller detection response because they have bigger chance being put into the negative set. For mid-scale objects, which could appear in positive samples for some images and in negative samples for others, we rely on the object detector to produce a "middle" high score. To improve the localization precision, we use the Regionlet Re-localization method to learn a support vector regression model to predict the actual object location.

The Regionlet classifier is a boosting classifier composed of thousands of weak classifiers:

$$H(x) = \sum_{t=1}^{T} h_t(x), \quad (1)$$

where T is the total number of training stages, $h_t(x)$ is the weak classifier learned at stage t in training, x is the input image. The weak classifier $h_t(x)$ can be written as a function of several parameters: the spatial location of Regionlets in $h_t$, and the feature used for $h_t$, as following:

$$h_t(x) = G(p_t, f_t, x), \quad (2)$$

where $p_t$ is a set of Regionlet locations, $f_t$ is the feature extracted in these regionlets. The feature extraction locations p are defined to be proportional to the resolution of the detection window. Because feature extraction regions are automatically adapted to accommodate the detection window size, the Regionlet detector operates on the original object scale and the Regionlet detector is used for our fine-grained image classification.

In the testing phase, we apply the Regionlet detector to all the object proposals. We extend the conventional non-max suppression by only taking the object proposal that gives the maximum detection response. This operation is done over the whole image, regardless of the overlap between two detections.

Our system does not crop out a single image but rather generate multiple patches guided by detection. One embodiment uses a non-uniform sampling approach based on the detected position of the interesting object. The assumption of the non-uniform sampling is that the detected bounding box provides a good estimation of the true position of the interesting object. The further of an image patch from the detected region, the less likely it will contain the interesting object. To this end, we generate multiple image patches with a given size according to how much they overlap with the detected region.

In one embodiment, s*s denote the size of the input image to CNN, which is also the size of the sampled image patch. Given a training image I with size w*h, we let $(x_o, y_o)$ denote the coordinate of the detected object, i.e., the center of the bounding box that includes the interesting object and let $R_o$ denote the region of the detected bounding box. Similarly, let denote a position in the image and it is associated with a fixed size region that is centered at (x,y). The sampling space is given by $S=\{(x,y): R_{x,y} \subset I, |R_{x,y} \cap R_o| \geq \tau\}$, where is an overlapping threshold and denotes the size of overlap between the image patch defined by and the bounding box. We set to be 0 and sample following a multinomial distribution, with a probability proportional to $|R_{x,y} \cap R_o|$. Thus, a region with a large overlap with the bounding box has a high probability to be sampled and used as a training example to the CNN.

In order to efficiently implement the multinomial sampling of image patches, we can first compute a cumulative probability map for each training image according to the detected bounding box and then sample a coordinate by uniform sampling from the probability quantiles. The prediction on a testing image is averaged probability over five crops from the original image and their flipped copies, as well as five crops around the detection and their flipped copies.

On embodiment utilizes the neural network structure for image-net classification except that we have 333 object categories. In one embodiment a fine-grained image classification experiment is carried out using three different configurations:

- Centered uniform sampling: the input image is resized to 256×y or x×256. The 224×224 training samples are uniformly sampled from the center 256×256 region, which is the standard baseline setup
- A uniform sampling: the input image is resized to 256×y or x×256. The 224×224 training samples are uniformly sampled from the entire image.
- A multinomial sampling: the input image is resized to 256×y or x×256. The 224×22 training are sampled from the entire image with a preference for the location of the maximum detection response.

In one example, sampling the image crops from the entire image produces considerably better performance. It may be because there are many side view cars in our image, crops only from the center part of the image may lose the information of front and back of the car, which sometimes are needed to differentiate two cars. The classification accuracy is significantly boosted by enforcing multinomial sampling based on detection outputs.

In sum, the unique properties of fine-grained image classification are exploited by an effective pipeline with two processes: saliency-aware object detection and multinomial object-centric sampling for deep CNN training. The first component is achieved by constructing saliency-aware training data construction and training an adapted Regionlet detector. Compared to traditional detection approaches, our detector yields higher response on salient objects. The resulting detections are used in an object-centric sampling scheme to guide the sampling procedure in deep CNN training. The effectiveness of our fine-grained image classification framework was shown to be dramatic, improving the top-1 classification accuracy from 81.6% to 89.3%. To study the effectiveness of the object-centric sampling, we also constructed a large-scale fine-grained car classification dataset.

As shown in FIG. 9, an autonomous driving system 100 in accordance with one aspect includes a vehicle 101 with various components. While certain aspects are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, construction vehicles, farm equipment, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercial CPUs. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors, computers or memories that may or may not operate in parallel. Rather than using a single processor to perform the steps described herein some of the components such as steering components and deceleration components may each have their own processor that only performs calculations related to the component's specific function.

In various aspects described herein, the processor may be located remotely from the vehicle and communicate with the vehicle wirelessly. In other aspects, some of the processes described herein are executed by a processor disposed within the vehicle and others by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input (e.g., a mouse, keyboard, touch screen and/or microphone), as well as various sensors (e.g. a video camera) for gathering the explicit (e.g., a gesture) or implicit (e.g., "the person is asleep") information about the states and desires of a person.

The vehicle may also include a geographic position component 144 in communication with computer 110 for determining the geographic location of the device. For example, the position component may include a GPS receiver to determine the device's latitude, longitude, and/or altitude position. Other location systems such as laser-based localization systems, inertia-aided GPS, or camera-based localization may also be used to identify the location of the vehicle. The vehicle may also receive location information from various sources and combine this information using various filters to identify a "best" estimate of the vehicle's location. For example, the vehicle may identify a number of location estimates including a map location, a GPS location, and an estimation of the vehicle's current location based on its change over time from a previous location. This information may be combined to identify a highly accurate estimate of the vehicle's location. The "location" of the vehicle as discussed herein may include an absolute geographical location, such as latitude, longitude, and altitude as well as relative location information, such as location relative to other cars in the vicinity which can often be determined with less noise than absolute geographical location.

The device may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front wheels).

The vehicle may include components 148 for detecting objects external to the vehicle such as other vehicles, obstacles in the roadway, traffic signals, signs, trees, etc. The detection system may include lasers, sonar, radar, cameras or any other detection devices. For example, if the vehicle is a small passenger car, the car may include a laser mounted on the roof or other convenient location. In one aspect, the laser may measure the distance between the vehicle and the object surfaces facing the vehicle by spinning on its axis and changing its pitch. The laser may also be used to identify lane lines, for example, by distinguishing between the amount of light reflected or absorbed by the dark roadway and light lane lines. The vehicle may also include various radar detection units, such as those used for adaptive cruise control systems. The radar detection units may be located on the front and back of the car as well as on either side of the front bumper. In another example, a variety of cameras may be mounted on the car at distances from one another which are known so that the parallax from the different images may be used to compute the distance to various objects that are captured by one or more cameras, as exemplified by the camera of FIG. 1. These sensors allow the vehicle to understand and potentially respond to its environment to maximize safety for passengers as well as objects or people in the environment.

In addition to the sensors described above, the computer may also use input from sensors typical of non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time; that is, the sensors may continuously update their output to reflect the environment being sensed at or over a range of time, and continuously or as demanded provide that updated output to the computer so that the computer can determine whether the vehicle's then-current direction or speed should be modified in response to the sensed environment.

These sensors may be used to identify, track and predict the movements of pedestrians, bicycles, other vehicles, or objects in the roadway. For example, the sensors may provide the location and shape information of objects surrounding the vehicle to computer 110, which in turn may identify the object as another vehicle. The object's current movement may also be determined by the sensor (e.g., the component is a self-contained speed radar detector), or by the computer 110, based on information provided by the sensors (e.g., by comparing changes in the object's position data over time).

The computer may change the vehicle's current path and speed based on the presence of detected objects. For example, the vehicle may automatically slow down if its current speed is 50 mph and it detects, by using its cameras and using optical-character recognition, that it will shortly pass a sign indicating that the speed limit is 35 mph. Similarly, if the computer determines that an object is obstructing the intended path of the vehicle, it may maneuver the vehicle around the obstruction.

The vehicle's computer system may predict a detected object's expected movement. The computer system 110 may simply predict the object's future movement based solely on the object's instant direction, acceleration/deceleration and velocity, e.g., that the object's current direction and movement will continue.

Once an object is detected, the system may determine the type of the object, for example, a traffic cone, person, car, truck or bicycle, and use this information to predict the object's future behavior. For example, the vehicle may determine an object's type based on one or more of the shape of the object as determined by a laser, the size and speed of the object based on radar, or by pattern matching based on camera images. Objects may also be identified by using an object classifier which may consider one or more of the size of an object (bicycles are larger than a breadbox and smaller than a car), the speed of the object (bicycles do not tend to go faster than 40 miles per hour or slower than 0.1 miles per hour), the heat coming from the bicycle (bicycles tend to have a rider that emits body heat), etc.

In some examples, objects identified by the vehicle may not actually require the vehicle to alter its course. For example, during a sandstorm, the vehicle may detect the sand as one or more objects, but need not alter its trajectory, though it may slow or stop itself for safety reasons.

In another example, the scene external to the vehicle need not be segmented from the input from the various sensors, nor do objects need to be classified for the vehicle to take a responsive action. Rather, the vehicle may take one or more actions based on the color and/or shape of an object.

The system may also rely on information that is independent of the detected object's movement to predict the object's next action. By way of example, if the vehicle determines that another object is a bicycle that is beginning to ascend a steep hill in front of the vehicle, the computer may predict that the bicycle will soon slow down—and will slow the vehicle down accordingly—regardless of whether the bicycle is currently traveling at a relatively high speed.

It will be understood that the foregoing methods of identifying, classifying, and reacting to objects external to the vehicle may be used alone or in any combination in order to increase the likelihood of avoiding a collision.

By way of further example, the system may determine that an object near the vehicle is another car in a turn-only lane (e.g., by analyzing image data that captures the other car, the lane the other car is in, and a painted left-turn arrow in the lane). In that regard, the system may predict that the other car may turn at the next intersection.

The computer may cause the vehicle to take particular actions in response to the predicted actions of the surrounding objects. For example, if the computer 110 determines that another car approaching the vehicle is turning, for example based on the car's turn signal or in which lane the car is, at the next intersection as noted above, the computer may slow the vehicle down as it approaches the intersection. In this regard, the predicted behavior of other objects is based not only on the type of object and its current trajectory, but also based on some likelihood that the object may or may not obey traffic rules or pre-determined behaviors. This may allow the vehicle not only to respond to legal and predictable behaviors, but also correct for unexpected behaviors by other drivers, such as illegal u-turns or lane changes, running red lights, etc.

In another example, the system may include a library of rules about object performance in various situations. For example, a car in a left-most lane that has a left-turn arrow mounted on the light will very likely turn left when the arrow turns green. The library may be built manually, or by the vehicle's observation of other vehicles (autonomous or not) on the roadway. The library may begin as a human-built set of rules which may be improved by vehicle observations. Similarly, the library may begin as rules learned from vehicle observation and have humans examine the rules and improve them manually. This observation and learning may be accomplished by, for example, tools and techniques of machine learning.

In addition to processing data provided by the various sensors, the computer may rely on environmental data that was obtained at a previous point in time and is expected to persist regardless of the vehicle's presence in the environment. For example, data 134 may include detailed map information 136, for example, highly detailed maps identifying the shape and elevation of roadways, lane lines, intersections, crosswalks, speed limits, traffic signals, buildings, signs, real-time traffic information, or other such objects and information. Each of these objects such as lane lines or intersections may be associated with a geographic location that is highly accurate, for example, to 15 cm or even 1 cm. The map information may also include, for example, explicit speed limit information associated with various roadway segments. The speed limit data may be entered manually or scanned from previously taken images of a speed limit sign using, for example, optical character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

In another example, the vehicle may use the map information to supplement the sensor data in order to better identify the location, attributes, and state of the roadway. For example, if the lane lines of the roadway have disappeared through wear, the vehicle may anticipate the location of the lane lines based on the map information rather than relying only on the sensor data.

The vehicle sensors may also be used to collect and supplement map information. For example, the driver may drive the vehicle in a non-autonomous mode in order to detect and store various types of map information, such as the location of roadways, lane lines, intersections, traffic signals, etc. Later, the vehicle may use the stored information to maneuver the vehicle. In another example, if the vehicle detects or observes environmental changes, such as a bridge moving a few centimeters over time, a new traffic pattern at an intersection, or if the roadway has been paved and the lane lines have moved, this information may not only be detected by the vehicle and used to make various determination about how to maneuver the vehicle to avoid a collision, but may also be incorporated into the vehicle's map information. In some examples, the driver may optionally select to report the changed information to a central map database to be used by other autonomous vehicles by transmitting wirelessly to a remote server. In response, the server may update the database and make any changes available to other autonomous vehicles, for example, by transmitting the information automatically or by making available downloadable updates. Thus, environmental changes may be updated to a large number of vehicles from the remote server.

In another example, autonomous vehicles may be equipped with cameras for capturing street level images of roadways or objects along roadways.

Computer 110 may also control status indicators 138, in order to convey the status of the vehicle and its components to a passenger of vehicle 101. For example, vehicle 101 may be equipped with a display 225, as shown in FIG. 2, for displaying information relating to the overall status of the vehicle, particular sensors, or computer 110 in particular. The display 225 may include computer generated images of the vehicle's surroundings including, for example, the status of the computer, the vehicle itself, roadways, intersections, as well as other objects and information.

Computer 110 may use visual or audible cues to indicate whether computer 110 is obtaining valid data from the various sensors, whether the computer is partially or completely controlling the direction or speed of the car or both, whether there are any errors, etc. Vehicle 101 may also include a status indicating apparatus, such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, or provide various other types of indications. In addition, the computer may also have external indicators which indicate whether, at the moment, a human or an automated system is in control of the vehicle, that are readable by humans, other computers, or both.

In one example, computer 110 may be an autonomous driving computing system capable of communicating with various components of the vehicle. For example, computer 110 may be in communication with the vehicle's conventional central processor 160, and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

Systems and methods according to aspects of the disclosure are not limited to detecting any particular type of objects or observing any specific type of vehicle operations or environmental conditions, nor limited to any particular machine learning method, but may be used for deriving and learning any driving pattern with any unique signature to be differentiated from other driving patterns.

The sample values, types and configurations of data described and shown in the figures are for the purposes of illustration only. In that regard, systems and methods in accordance with aspects of the disclosure may include various types of sensors, communication devices, user interfaces, vehicle control systems, data values, data types and configurations. The systems and methods may be provided and received at different times (e.g., via different servers or databases) and by different entities (e.g., some values may be pre-suggested or provided from different sources).

As these and other variations and combinations of the features discussed above can be utilized without departing from the systems and methods as defined by the claims, the foregoing description of exemplary embodiments should be taken by way of illustration rather than by way of limitation of the disclosure as defined by the claims. It will also be understood that the provision of examples (as well as clauses phrased as "such as," "e.g.", "including" and the like) should not be interpreted as limiting the disclosure to the specific examples; rather, the examples are intended to illustrate only some of many possible aspects.

Unless expressly stated to the contrary, every feature in a given embodiment, alternative or example may be used in any other embodiment, alternative or example herein. For instance, any appropriate sensor for detecting vehicle movements may be employed in any configuration herein. Any data structure for representing a specific driver pattern or a signature vehicle movement may be employed. Any suitable machine learning methods may be used with any of the configurations herein.

The invention claimed is:

1. A method for classifying a vehicle type, comprising:
performing scale aware detection;
performing detection assisted sampling for convolutional neural network (CNN) training; and
performing deep CNN fine grained image classification to classify the vehicle type;
wherein the scale aware detection is trained using a Regionlet detector, the Regionlet detector is a boosting classifier composed of weak classifiers:

$$H(x) = \sum_{i=1}^{T} h_i(x),$$

wherein T is the total number of training stages, h(x) is the weak classifier learned at stage t in training, x is the input image,
wherein the weak classifier h(x) is written as a function of the spatial location of Regionlets in h, and a feature used for h:

$h_t(x) = G(p_t, f_t, x),$ wherein p is a set of Regionlet locations, f is the feature extracted in the set of Regionlet locations.

2. The method of claim 1, comprising using a selective search to generate object proposals for detection training and testing.

3. The method of claim 2, wherein object proposals with more than 70% overlap with the ground truth are selected as positive samples during training and object proposals with less than 0.3% overlap with the ground truth are used as negative training samples.

4. The method of claim 1, comprising apply multinomial sampling to images of the vehicle type.

5. The method of claim 1, comprising applying regionlet re-localization method to learn a support vector regression model to predict an actual object location.

6. The method of claim 1, comprising providing non-max suppression by taking the object proposal which gives the maximum detection response.

7. The method of claim 1, comprising detecting an object with awareness of object scales and occlusions.

8. The method of claim 7, wherein small detection responses are linked to small or occluded objects, or false alarms.

9. The method of claim 1, comprising constructing a saliency aware dataset and using a scale aware object detection.

10. The method of claim 1, comprising achieving occlusion awareness by training with visible objects.

11. The method of claim 1, comprising labeling only a salient object in one image and checking consistency with a fine-grained category label.

12. The method of claim 1, comprising labeling only one object as a detection ground truth for each image.

13. The method of claim 1, comprising selecting an object based on mixed criteria of saliency.

14. The method of claim 13, wherein the object is selected based on one or more of the following preferences: a big object preferred over small object, a visible object preferred over occluded object; a central object preferred over corner object, and consistency of an object's fine-grained category label with the image label.

15. A system to classify vehicles, comprising: a scale aware detector receiving an input image;
a deep convolutional neural network (CNN) coupled to the scale aware detector to classify a vehicle;
a detection assisted sampling module coupled to the scale aware detector, the sampling module generating data for CNN training; and
a deep CNN training module coupled to the detection assisted sampling module and the deep CNN;
wherein the scale aware detector is trained using a Regionlet detector, the Regionlet detector is a boosting classifier composed of weak classifiers:

$$H(x) = \sum_{i=1}^{T} h_i(x),$$

wherein T is the total number of training stages, h(x) is the weak classifier learned at stage t in training, x is the input image,
wherein the weak classifier h(x) is written as a function of the spatial location of Regionlets in h, and a feature used for h:

$h_t(x) = G(p_t, f_t, x),$ wherein p is a set of Regionlet locations, f is the feature extracted in the set of Regionlet locations.

16. The system of claim 15, comprising a camera or a database of car images to provide input images.

17. The system of claim 15, comprising a Regionlet detector for training the scale aware detection.

18. The system of claim 15, comprising a vehicle or a machine controlled in part using the vehicle classification from the deep CNN.

* * * * *